(No Model.)  2 Sheets—Sheet 1.
B. C. COUPLAND & F. T. HOUGH.
CART SCALE.
No. 502,810. Patented Aug. 8, 1893.
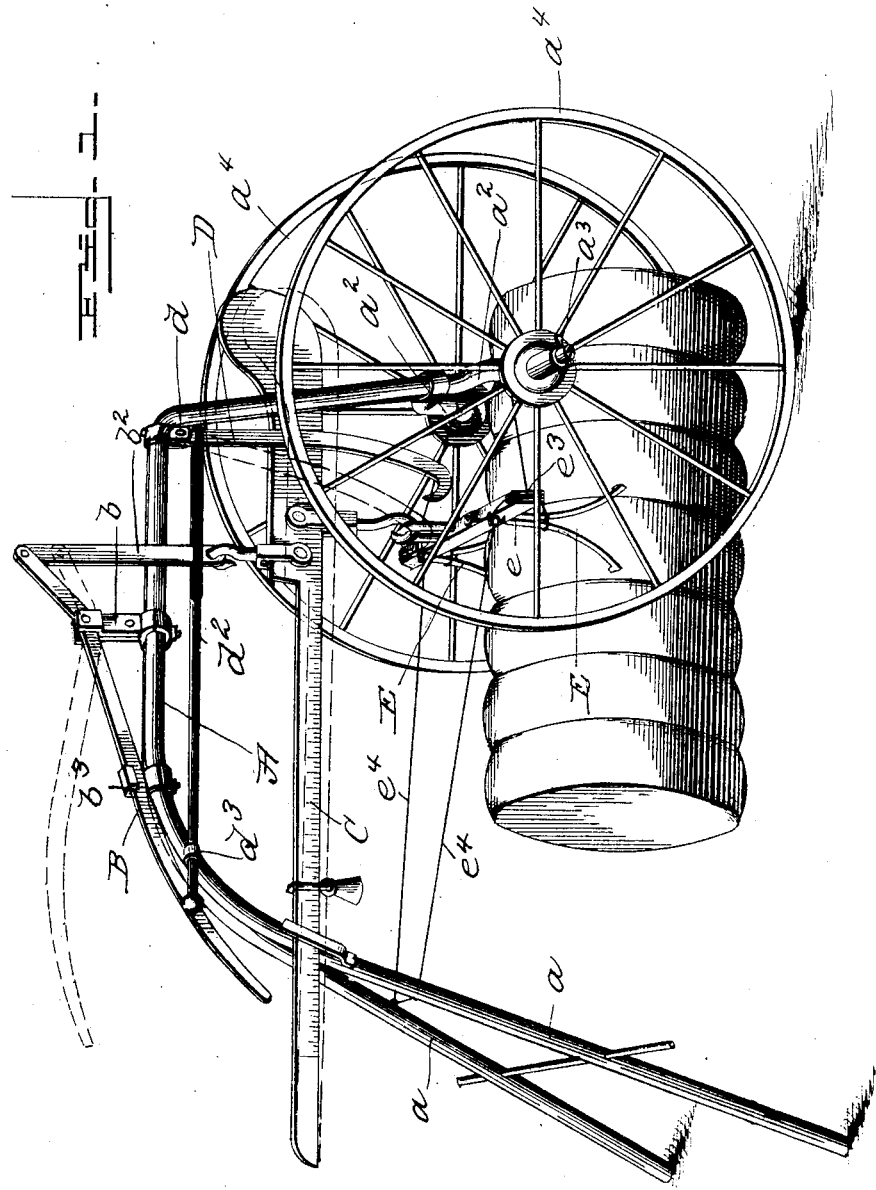
WITNESSES:
INVENTORS
Benjamin C. Coupland and
Franklin T. Hough
BY
Myers & Co.
ATTORNEYS.

(No Model.) 2 Sheets—Sheet 2.
B. C. COUPLAND & F. T. HOUGH.
CART SCALE.
No. 502,810. Patented Aug. 8, 1893.
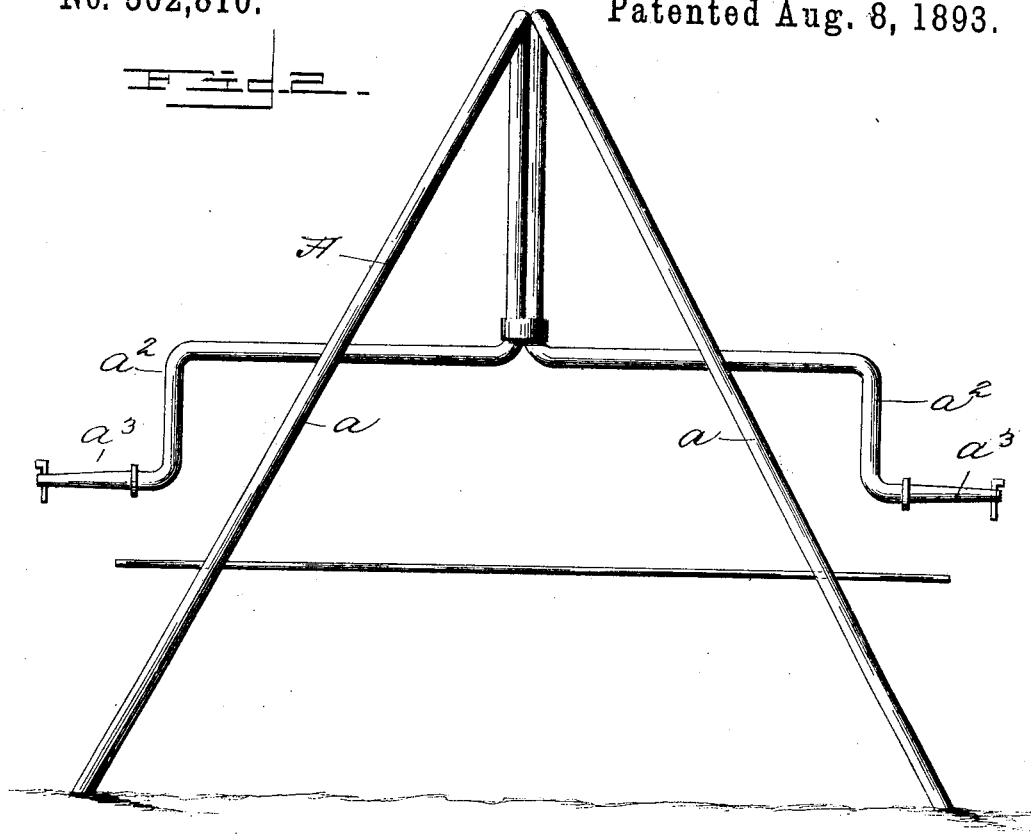
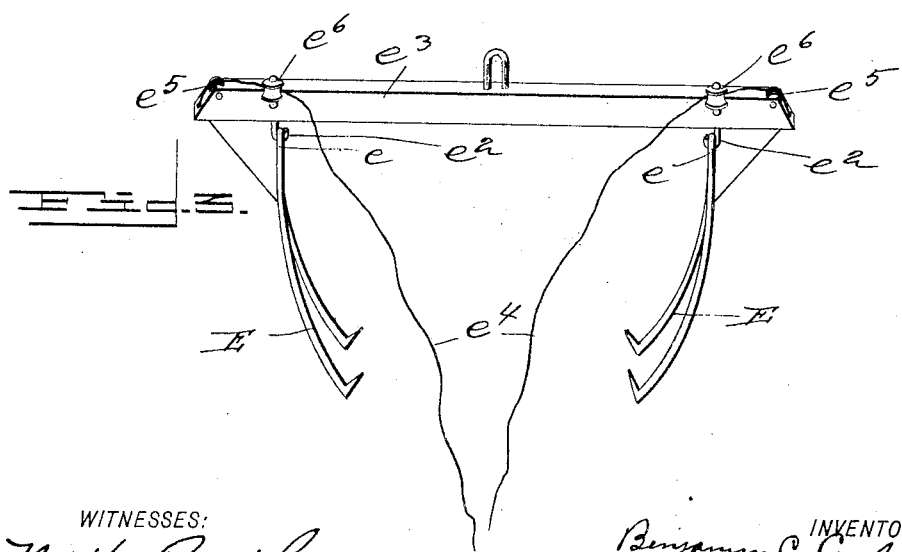
WITNESSES:
INVENTORS
Benjamin C. Coupland and
Franklin T. Hough
BY
Myers & Co.
ATTORNEYS

UNITED STATES PATENT OFFICE.

BENJAMIN C. COUPLAND AND FRANKLIN T. HOUGH, OF RUSK, TEXAS.

CART-SCALE.

SPECIFICATION forming part of Letters Patent No. 502,810, dated August 8, 1893.

Application filed January 5, 1893. Serial No. 457,422. (No model.)

*To all whom it may concern:*

Be it known that we, BENJAMIN C. COUPLAND and FRANKLIN T. HOUGH, citizens of the United States of America, residing at Rusk, in the county of Cherokee and State of Texas, have invented certain new and useful Improvements in Scale-Sulkies, of which the following is a specification, reference being had therein to the accompanying drawings.

This invention relates to improvements in weighing scales particularly to that class known as portable bale weighing scales, the object of the invention being to employ a truck or sulky frame, suitable for transporting goods; furthermore, means combined with said frame whereby the goods may be readily weighed; furthermore, means for supporting the goods on the truck independent of the weighing mechanism.

Furthermore, the object of the invention resides in the provision of a device that shall be light, strong and comparatively inexpensive of manufacture.

With these objects in view, the invention consists in various novel details of construction, combinations and arrangements of parts, hereinafter more fully set forth and claimed.

In describing the invention in detail, reference is had to the accompanying drawings forming part of this specification wherein—

Figure 1. is a view in perspective of one form of device embodying our improvements, showing a bale of goods suspended from the scale beam and (in dotted lines) the relief hook in position to receive the same. Fig. 2. is a view in end elevation of the frame proper, and Fig. 3. is an enlarged view in detail of the grab hooks, governing cables, &c.

Similar letters indicate corresponding parts in the several views, in which—

A— indicates the sulky frame comprising two equal lengths of tubing secured either by welding or adjustable clips. These tubes are arranged with downwardly bent legs $a, a$, diverging to the approximate form of a V, and adapted for supporting the forward end of the vehicle. The rear ends being also downwardly bent, extend to a point adjacent the axial line of the supporting wheels when they are again bent in opposite directions, forming right angular arms $a^2, a^2$, terminating in wheel receiving spindles $a^3, a^3$. These wheels $a^4, a^4$, are secured in position by shrunk washers on the inner, and keys on the outer ends of the spindles, as shown in Fig. 2.

B, represents the scale beam supporting lever which is pivotally mounted on the upright $b$, adjustably secured on the horizontal portion of the frame A, and from a depending link $b^2$, of this lever the scale beam C, of any well known construction, is suspended. Pivotally secured in the frame A, as at $d$, is a relief hook D, which is adapted to be controlled and operated by the rod $d^2$, supported in bearings $d^3$. The provision of this hook is for the purpose of freeing the beam of all weight while the goods are being transported from different points about, for example, a ware-house.

E, E, are grab hooks provided at their upper ends with eyes $e, e$, engaging hooks $e^2, e^2$, of the bar $e^3$. These hooks E, E, are arranged to swing laterally which movement is effected by means of the cables $e^4, e^4$, guided on pulleys $e^5, e^6$, and extending to the forward legs of the frame wheel, to which they are secured, as shown.

The operation of the device is as follows: The sulky is placed over the bale, box or other article to be weighed with the grab hook operating cable drawn taut and the scale beam supporting lever elevated; as this cable is suddenly released the hooks will fall by their own weight to engage the bail, and the operator depresses the beam supporting lever and thereby secures it by the sliding catch $b^3$, thereby elevating the load in proper position for weighing. If this particular article is to be moved to a distant point in the ware-house, the rod $d^2$, is drawn outwardly to effect an engagement between the relief hook and the link of the beam thereby shifting the load to bring the bulk of the weight nearer the axle.

It will be particularly noted that various changes may be made in the detail construction of this invention without materially departing from the general idea involved.

We claim—

1. The combination with a scale beam of an angular supporting frame mounted upon wheels and having its forward ends bent downwardly and diverging to an approximate V-form, as specified.

2. The combination with a scale beam, of an angular supporting frame terminating at its rear end in wheel receiving spindles and provided at its forward end with a V-shaped rest, as specified.

3. The combination with a supporting frame terminating at its rear end in wheel receiving spindles and provided at its forward end with a V-shaped rest, of an elevating lever supported above the frame, the scale beams detachably connected with the said lever, the grab hooks suspended from a cross bar, and the hook and eye connection between the cross bar and the beam, as specified.

4. The combination with a supporting frame as described, of a scale beam, and an elevating lever adapted for raising and lowering the beam, the engaging hooks suspended from the beam, a relief hook and a draw-rod for operating said relief hook, as specified.

5. The combination with a scale beam, of an elevating lever, the engaging hooks detachably suspended from the beam, a relief hook and a draw-rod adapted for operating the said relief hook to disengage and support said engaging hooks, as specified.

In testimony whereof we affix our signatures in presence of two witnesses.

BENJAMIN C. COUPLAND.
FRANKLIN T. HOUGH.

Witnesses:
P. S. BLACK,
JIM MITCHELL.